Sept. 9, 1941.                    H. E. FINK                    2,255,244
                         STRAW RETAINER IN SEPARATORS
                              Filed Oct. 25, 1939
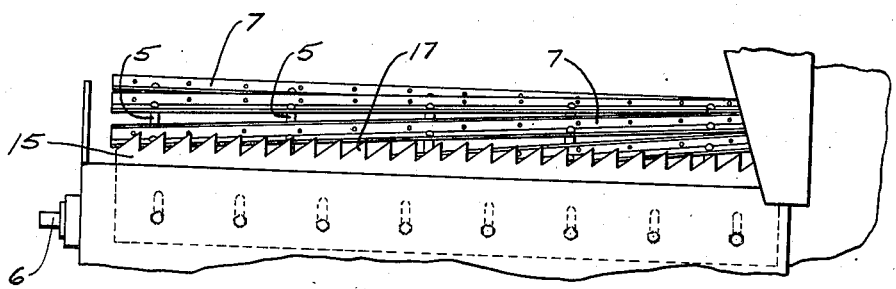
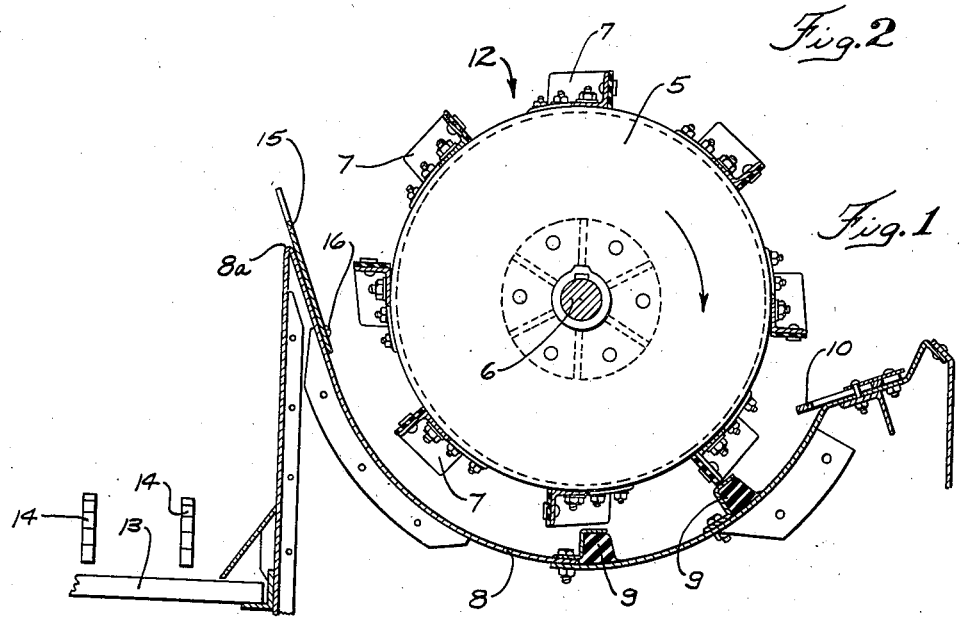
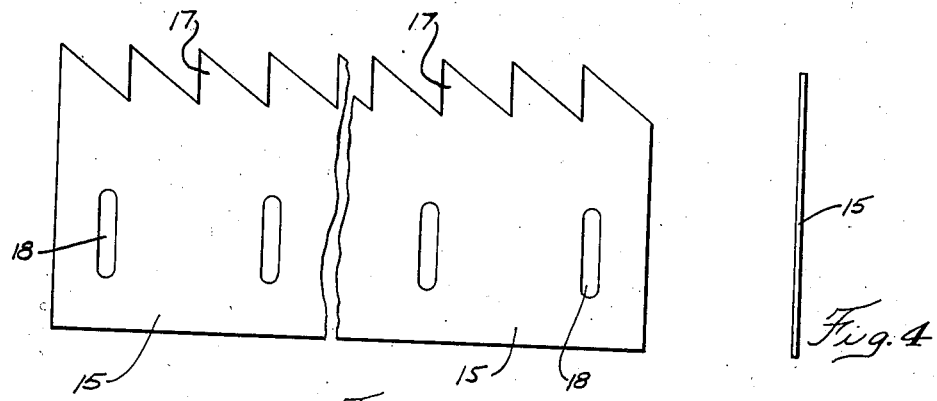
INVENTOR
HERBERT E. FINK,
By Minturn & Minturn,
ATTORNEYS Patented Sept. 9, 1941

2,255,244

UNITED STATES PATENT OFFICE 2,255,244

STRAW RETAINER IN SEPARATORS

Herbert E. Fink, Greenfield, Ind.

Application October 25, 1939, Serial No. 301,259

2 Claims. (Cl. 130—27)

This invention relates to means for preventing straw from wrapping around the cylinder of a separator or threshing machine. The invention is adapted to be employed not only in the usual traveling separator popularly known as a combine but also in the usual and well known stationary separator to which grain bearing straw is brought.

Particularly in the combines now available, the grain is cut from a standing position by the combine and immediately carried up to a cylinder which carries the straw around between it and is concave to beat, rub, and strip out grain or seed appearing in the material. In many cases, particularly when the cylinder speed is reduced and the straw is heavy or is in such a tangled condition, there is a tendency for that straw to pile up behind that cylinder to such an extent that it will become re-engaged with the cylinder and be pulled back over the top thereof. When this condition exists, the cylinder will become clogged or rather the space between it and the concave will be so completely filled by that pulled over straw as to prevent further entrance therebetween of the straw, the machine then becoming choked.

By use of my invention, this possible condition of the straw becoming re-engaged with the cylinder is prevented. My invention is highly successful under the most extreme conditions encountered, such, for example, as in the handling of soy beans, sweet clover, badly tangled and down wheat, and oats.

The advantages of the invention will become apparent at once to those versed in the art in the following description of one particular form of the invention as illustrated in the accompanying drawing, in which Fig. 1 is a longitudinal, vertical section through a cylinder and concave with the invention applied thereto;

Fig. 2, a detail in rear elevation of the rear end of the concave;

Fig. 3, a front elevation of the straw retaining blade; and

Fig. 4, an end elevation of the blade.

Like characters of reference indicate like parts throughout the several views in the drawing.

In different types and makes of separators or combines, there will be encountered slightly different and varying structures forming the cylinder and concave assembly. The particular details of the construction of these elements do not enter in themselves into my invention. The general arrangement of the cylinder and concave in each instance is the same. Referring to Fig. 1 in the drawing, a sectional view is indicated of one particular type of cylinder and concave found in widely sold combines.

A plurality of spaced apart discs or heads 5 are fixed to a driving shaft 6. These discs 5 are each of the same diameter. To their peripheries are secured preferably in a spiral manner a number of cylinder bars 7, here shown as eight in number and each consisting of an angle bar. These bars are of sufficient length to traverse all of the discs 5 to constitute the length of the resultant cylinder.

Under the cylinder above described is mounted the concave 8, this concave being approximately semicylindrical and spaced a distance radially from the outer edges of the bars 7. The rear or discharge end of the concave 8 terminates substantially at or above the axis of the shaft 6. Mounted across the concave 8 are a plurality of concave bars 9, herein shown as two in number. Each bar 9 comprises a metal backing under which, in the form shown, is secured a resilient filler, the surface of which is exposed on the forward side. At the front end of the concave 8 is an adjustable plate 10 generally termed the shelling plate. The cylinder bars 7 preferably have a resilient facing on their forward side. The cylinder generally designated by the numeral 12 turns in the direction as indicated by the arrow. As the straw is carried around between the cylinder 12 and the concave 8, the grain or seed is separated therefrom upon passing between the bars 7 and the shelling plate 10 and also between those bars 7 and the concave bars 9. The straw as well as the separated seed is thrown on up over the rear edge 8a of the concave to drop down on to the straw rack 13. This rack 13 is given a reciprocatory motion which in combination with the usual straw rack fish backs 14, feeds the straw transversely of the cylinder over the rack 13 to carry the straw on through the separator as the seeds are screened and blown from the straw. Normally the separator is designed to feed this straw laterally, sufficiently fast so as to accommodate all straw thereon as rapidly as that straw is fed thereto by the cylinder 12.

However, as above indicated, conditions are frequently encountered where the amount of the straw, and particularly its tangled condition, result in a deposit of straw on the rack 13 to such an extent that it will pile up about the concave edge 8a and roll forwardly onto the cylinder 12, the direction of travel of the cylinder aiding in the return of the excess straw.

In order to overcome this particular difficulty in the feeding back of the straw, I provide an extension above the concave edge 8a, this extension in the present form consisting of a metal plate 15. This plate 15 is formed to fit intimately across the front face of the upper rear end of the concave and is secured thereto by any suitable means, such as by the bolts 16. The plate 15 is located on this portion of the concave to have approximately a projection above the edge 8a of four inches. This dimension may be varied to meet conditions and the plate 15 is provided with slots 18 through which the bolts 16 pass to permit this adjustment.

Along the top edge of plate 15 I form a plurality of teeth 17. Each of these teeth has a straight vertical edge on that side thereof toward which the straw will be shifted on the rack 13. The other edge of each tooth 17 is sloped downwardly from an upper sharp point to the base of the vertical edge of the next adjacent tooth. This structure results in a series of teeth as indicated in Figs. 2 and 3. It is to be noted that by mounting the plate 15 in the manner indicated, there will be a slight rearward inclination given to the teeth 17.

As the straw is discharged from between the cylinder and the concave and carried backwardly onto the rack 13, these teeth 17 offer no resistance to the travel of the straw as it is thus thrown over. However, should the straw pile up on the rack 13 to such an extent that further straw will be deposited about the edge 8a or should some of the straw in extremely heavy bunches or the like drop directly on the teeth 17, these teeth will retain the straw by engagement therein and sufficiently resist pulling it around forwardly over the cylinder 12 by action of the cylinder. While this preventive action is being carried out, the straw is still free to be shifted laterally along the rack 13 without hanging up on these teeth 17 by reason of the fact that the straw may readily slide upwardly on over the inclined edges of these teeth. The vertical edges resist backward travel of the straw. By so forming the teeth 17, these teeth project upwardly sufficiently far to become engaged in the excess straw and so as to not hinder or retard the desired lateral travel of the straw.

It is therefore to be seen that by the simple expedient of applying the plate 15 across the discharge edge of the concave 8, an exceedingly troublesome clogging of the cylinder is prevented. Normally without the use of my invention, it requires a great loss of time in stopping and cleaning the tangled straw off of the cylinder 12 and out of the concave 8 when that time is extremely valuable in getting out the dead ripe grain or seed within the extremely limited time available before that grain or seed shells out under normal action onto the ground.

While I have herein shown and described my invention in the particular form, it is obvious that structural changes may be employed without departing from the spirit of the invention, and I therefore do not desire to be limited to that precise form beyond the limitations which may be imposed by the following claims.

I claim:

1. In a grain separator, a cylinder, a concave under the cylinder, a straw receiving chamber behind the concave, means in said chamber for moving straw therein in a direction substantially parallel to the axis of said cylinder, said concave terminating by a rear edge above the floor of said chamber, and a plurality of saw-like teeth extending upwardly along and above said concave rear edge, over which teeth straw coming from between the under side of said cylinder and over said concave must pass to drop into said chamber, each of said teeth having a straight edge substantially normal to the axis of said cylinder and a sloping edge, both edges being in a common plane removed from but parallel with said cylinder axis, said sloping edges of the teeth being on those tooth sides opposite the direction of travel of the straw induced by said straw moving means, said teeth being in effect an upward extension of said concave, whereby said teeth form in effect a serrated edge along said concave edge to prevent drag back by the cylinder of straw from the straw receiving chamber.

2. In a grain separator, a cylinder, a concave under the cylinder, a straw receiving chamber behind the concave, means in said chamber for moving straw therein in a direction substantially parallel to the axis of said cylinder, said concave terminating by a rear edge above the floor of said chamber, and a plurality of saw-like teeth extending upwardly along and above said concave rear edge, over which teeth straw coming from between the under side of said cylinder and over said concave must pass to drop into said chamber, each of said teeth having a straight edge substantially normal to the axis of said cylinder and a sloping edge, both edges being in a common plane removed from but parallel with said cylinder axis, said sloping edges of the teeth being on those tooth sides opposite the direction of travel of the straw induced by said straw moving means, said teeth being in effect an upward extension of said concave, whereby said teeth form in effect a serrated edge along said concave edge to prevent drag back by the cylinder of straw from the straw receiving chamber, all of said teeth projecting above said concave edge a uniform distance and being fixed in position in relation to that concave edge.

HERBERT E. FINK.